United States Patent
Fülöp et al.

(10) Patent No.: US 6,268,687 B1
(45) Date of Patent: Jul. 31, 2001

(54) BASE FOR COMPACT FLUORESCENT LAMP

(75) Inventors: József Fülöp; Ferenc Papp; István Würsching, all of Budapest (HU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/326,132

(22) Filed: Jun. 4, 1999

(30) Foreign Application Priority Data

Jun. 9, 1998 (HU) ................................... 9801306

(51) Int. Cl.[7] ................................. H01J 5/48; H01J 5/50
(52) U.S. Cl. ............................. 313/318.01; 313/318.06; 313/318.09; 439/602; 439/611; 439/226; 439/646
(58) Field of Search ................. 313/318.01, 318.05, 313/318.06, 318.09, 318.12; 439/602, 611, 220, 226, 646, 236

(56) References Cited

U.S. PATENT DOCUMENTS

| | | | |
|---|---|---|---|
| 5,545,950 | * 8/1996 | Cho | 313/318.01 X |
| 5,585,688 | * 12/1996 | DeKleine | 313/318.09 X |
| 5,634,820 | 6/1997 | Vakil | 439/646 |
| 5,877,585 | 3/1999 | Fulop et al. | 313/318.02 |

FOREIGN PATENT DOCUMENTS 213598B   8/1997 (HU).

* cited by examiner

*Primary Examiner*—Ashok Patel

(57) ABSTRACT

The invention relates to a base for compact fluorescent lamp comprising a body and a cap which are fixed to each other along an outside connection surface, a discharge tube is fixed in the cap and metal pins ensuring a releasable electrical contact are fixed in the body Electrode inleads of the discharge tube are connected to the metal pins, and a connection hollow ensuring an also releasable mechanical joint is formed in the body Extensions as elongations of the wall of the connection hollow are formed inside the base where at least one opening is formed in the extensions and some of the electrode inleads are connected to the metal pins through the opening. Another aspect of the invention is that the extensions are formed inside the base as an elongation of the wall of the connection hollow, and some of the electrode inleads are passed through between the extensions and then are connected to the metal pins.

8 Claims, 3 Drawing Sheets

BASE FOR COMPACT FLUORESCENT LAMP

BACKGROUND OF THE INVENTION

The invention relates to a base for compact fluorescent lamp, and more particularly to a compact fluorescent lamp base which consists of a plastic cap and a plastic body.

Market expectations require the overall length of the lamp to be shorter and shorter. The overall length is determined by the length of the tube portion of the discharge tube and by the height of the fluorescent lamp base incorporating the ends of the discharge tube. Tube portion means a portion bent in several parts or composed of several parts by glass sealing between the two spatially farthest points of the discharge tube. A construction of compact fluorescent lamps is known wherein the fluorescent lamp base contains only the plastic cap for fixing the discharge tube and the plastic body fixed thereto, to which base a separate lampholder can be connected by a releasable joint. In this case, connections ensuring electrical contact and also mechanical joint are made between the lampholder and the base. For ensuring electrical contact, metal parts, particularly metal pins connecting in a releasable way to the electrical contact parts fixed in the lampholder are embedded in the base. The base and the lampholder are fixed mechanically and kept in position by an also releasable mechanical joint providing for exchangeability.

By meeting the market expectations mentioned, a version of the base and lampholder is known wherein the mechanical joint is provided for by forming a hollow in the base, to which a protruding part of the lampholder is connected. This solution exploits the opportunity that the empty space of the base can be utilized which reduces the overall length of the compact fluorescent lamp. This base construction is called an inverted base.

With respect to the present invention, the electrode inleads of the discharge tubes fixed in the base, the metal pins and the mechanical fixing elements formed in the body part of the base are of importance since the electrode inleads are directly fixed to the metal pins in this construction. During fixing, it should be provided for that the electrode inleads cannot get in galvanic contact with each other while the fixing elements ensuring mechanical joint and protruding into the base are also present.

Solutions are known for this type of compact fluorescent lamp bases which is also described in patent specification No. HU-213598. It is seen in this specification that the metal pins for electrical contact are placed at the four corners of an imaginary quadrangle around the axis of symmetry while the electrode inleads from the ends of the discharge tube are at one side. In this construction, the hazard exists that the electrode inleads get in contact with each other during assembly. This hazard is the greater the more portions the discharge tube consists of, in which case the relative position of the discharge tube ends and the metal pins for electrical contact, the position of which is specified in the standard, becomes particularly unfavorable.

It is known from the practice at the same time, that the cap fixing the discharge tube, of the two-part plastic base constructed for the inverted base and lampholder mentioned above, and the body of the base provided with construction elements for electrical and mechanical connection, are in general not fixed to each other sufficiently. E.g., in the base construction according to patent specification U.S. Pat. No. 5,634,820 and also in other base constructions that have become known by public use, the cap and the body are fixed to each other only along the outside perimeter. The axial force exerted when inserting the compact fluorescent lamp into and mainly when pulling it out from the lampholder appears along the perimeter of the cap and the body, and the resistance to pulling and particularly to torsional load is only sufficient if the matching parts are made with extraordinarily high accuracy. This has the consequence that providing a sufficient strength of bond reliably and continuously in the case of this type of base constructions is problematic. This problem is caused by the spread resulted from the mass production of parts and by the requirement for reducing the quantity of material used.

It is therefore seen to be desirable to construct a compact fluorescent lamp base ensuring that the electrode inleads cannot get in contact with each other during assembly when connecting the electrode inleads of the discharge tube to the metal pins, which results in a reduction of shrinkage.

Also, there is a particular need for a base construction enabling to make two-part plastic compact fluorescent lamp bases with a higher bond strength and with an increased resistance both to pulling, bending and torsional load, also in the case when the wall thickness is less than that of the known bases.

The invention is based on the recognition that in the case of compact fluorescent lamp bases of the type described above, fixing of the electrode inleads can be solved by lengthening the parts for mechanical joint with extensions inside the base and by adding further elements to these parts. We have also recognized that the extensions for fixing the electrode inleads can also be made suitable for making an inside connection surface by using further additional elements. This increases the strength of bond between the two parts of the base.

BRIEF SUMMARY OF THE INVENTION

The present invention provides a compact fluorescent lamp base comprising a body and a cap which are fixed to each other along an outside connection surface, the discharge tube is fixed in the cap and the metal pins for releasable electrical contact are fixed in the body, electrode inleads of the discharge tube are connected to the metal pins and a connection hollow for releasable mechanical joint is also formed in the body, wherein at least one extension as an elongation of the wall of the connection hollow is formed inside the base and at least one opening is formed in the extension and some of the electrode inleads are connected to the metal pins through this opening. Another aspect of the present invention is that some of the electrode inleads are passed between the extensions and the are connected to the metal pins.

The solutions in which an inside connection surface is made between a matching piece formed on the cap and the extensions are preferred embodiments of the compact fluorescent lamp base.

In the following, the essential features of the invention will be described in detail by showing two preferred embodiments, with reference to the figures of the attached drawing.

DETAILED DESCRIPTION OF THE INVENTION

Figure 1:
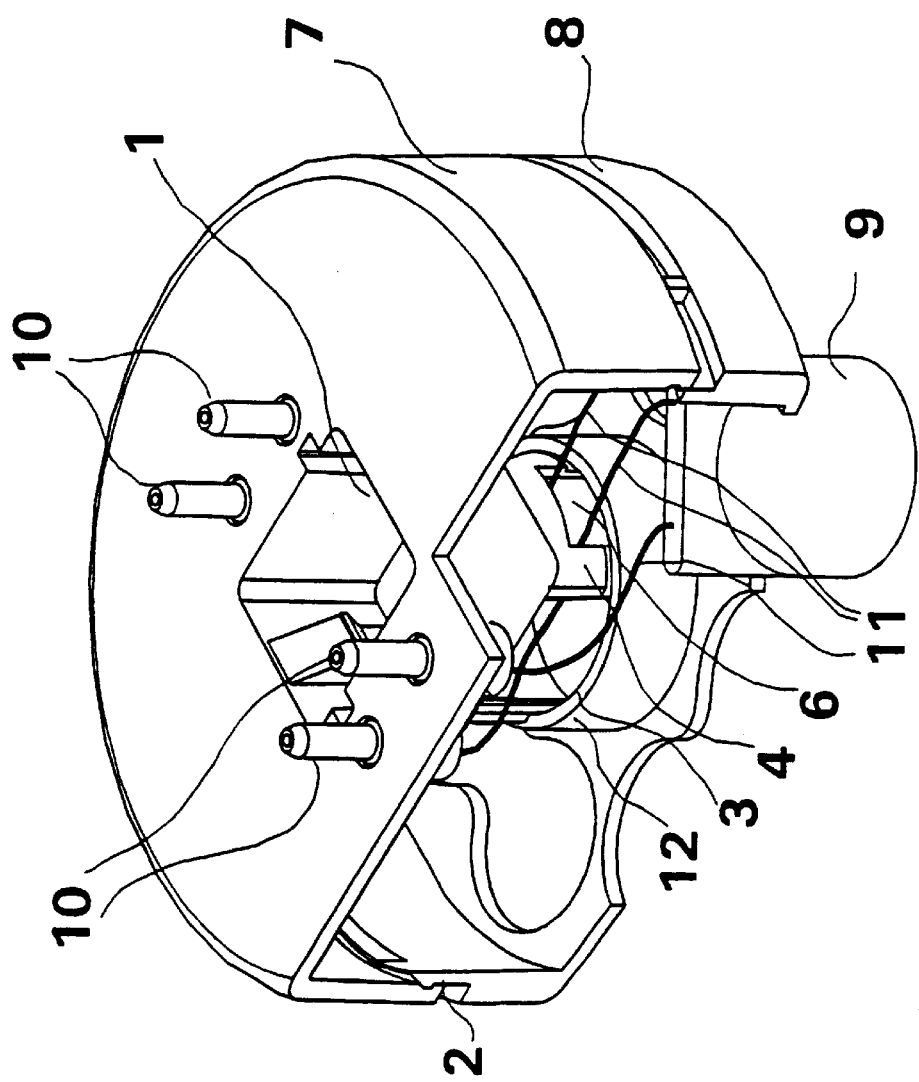
FIG. 1 shows an exploded view of an assembled compact fluorescent lamp base in which the invention is embodied.

In FIG. 1, an assembled compact fluorescent lamp base comprising a body 7 and a cap 8 is shown. The ends of discharge tube 9 protrude into the cap 8, however only one end is shown for the sake of easy survey. Metal pins 10 are placed in the body 7 which ensure a releasable electrical contact with the lampholder of the compact fluorescent lamp. The electrical connections between the metal pins 10 and the discharge tube 9 are made by electrode inleads 11. The also releasable mechanical joint to the lampholder of the compact fluorescent lamp is made by a connection hollow 1 that ensures fixed positioning with the corresponding matching piece of the lampholder (not shown in the figure). The body 7 and the cap 8 are fixed to each other along an outside connection surface 2 on one hand, and along an inside connection surface 3 on the other hand. The latter is made between extensions 4 protruding from the wall of the connection hollow 1 and a matching piece 12 protruding from the cap 8 in the way that the inside surface of the matching piece 12 gets in contact with the outside surface of the ends of the extensions 4. However, a solution is also conceivable in which the outside surface of the matching piece 12 gets in contact with the inner surface of the extensions 4. Two of the electrode inleads 11 are passed through an opening 6 formed in the extension 4 however a construction can also be made in which some of the electrode inleads 11 are passed between the extensions 4 and are then connected to the metal pins 10.

Figure 2:
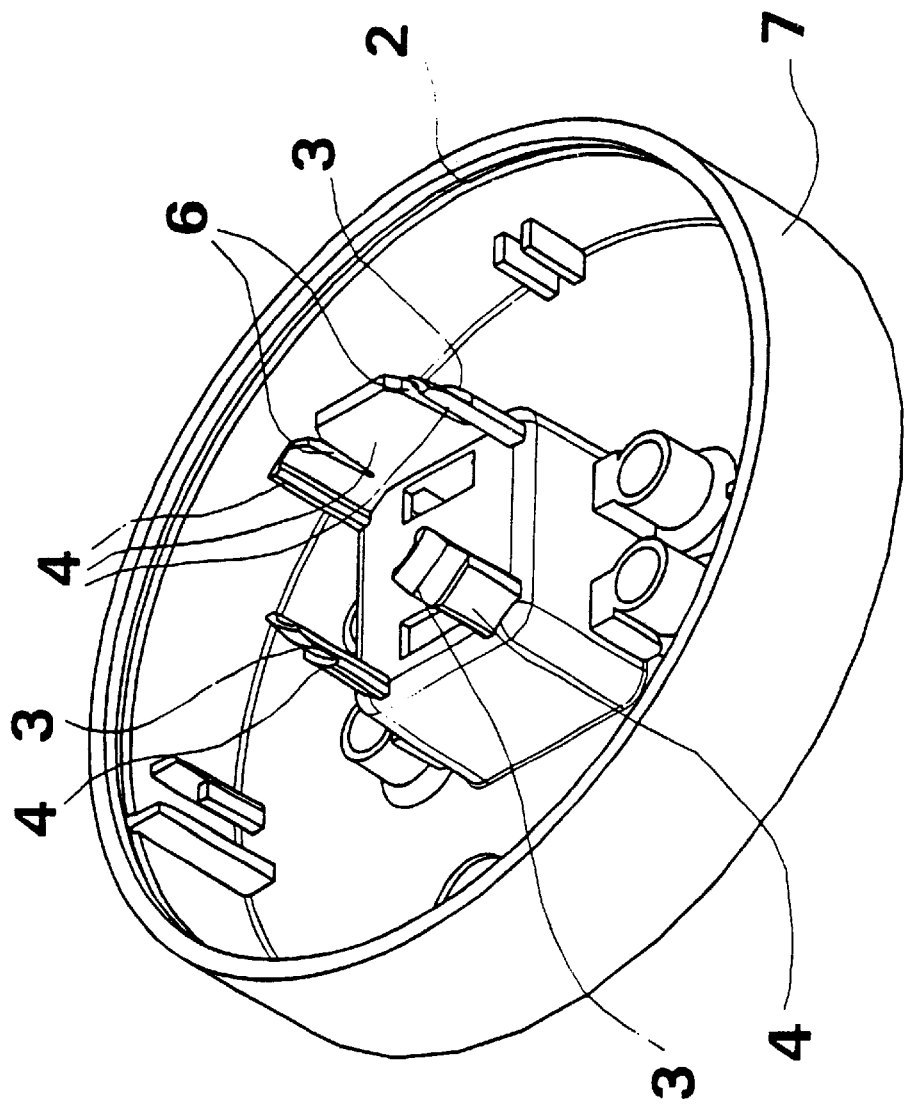
FIG. 2 shows a view of the body of the compact fluorescent lamp base according to another embodiment of the invention.

FIG. 2 shows the body 7 of the compact fluorescent lamp base. In this embodiment, disclosed as the best mode contemplated for carrying out this invention, two openings 6 rather than one are formed in one of the extensions 4 for positioning the electrode inleads. It is advantageous if the openings 6 narrow toward the connection hollow 1 because they fix the electrode inleads 11 more firmly in this case. It is also seen that the outside connection surface 2 is a slot making a full circle, to which interrupted rib portions of the cap 8 of FIG. 1 fit. The figure shows the outside surfaces of the extensions 4, to which the inside surface of the said matching piece 12 of FIG. 1 connects to make the inside connection surface 3 inside the base.

Figure 3:
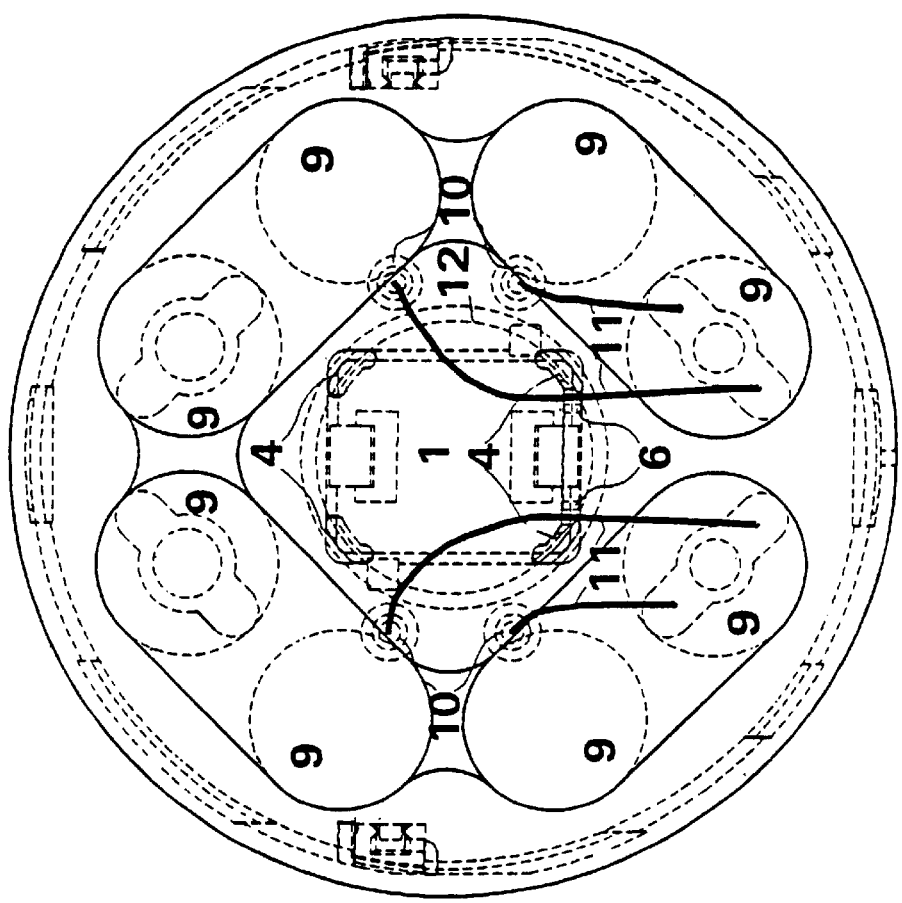
FIG. 3 shows a top view of the embodiment of the assembled compact fluorescent lamp base according to FIG. 1 or 2.

In FIG. 3, the top view of the compact fluorescent lamp base is shown where the covered parts, with the exception of the electrode inleads, are indicated with dashed lines. It is clearly seen in the figure that the two middle electrode inleads 11 reach the metal pins 10 through the openings 6. It is also seen clearly in this view that if the extensions 4 and the openings 6 between the extensions 4 were missing, the inside electrode inleads 11 would get in contact with the outside electrode inleads 11 during assembly which would make the lamp defective.

Construction details are also shown in the figures which are known for an expert but have no importance in respect of the present invention.

The assembly of the compact fluorescent lamp base, in which the present invention is embodied, is carried out as described below.

After fixing the discharge tube 9 in the cap 8, the electrode inleads 11 are bent in a template to have the appropriate shape and are drawn through the inner hole of the metal pins 10 placed in the body 7 previously. Then, the body 7 and the cap 8 are pushed together and fixed to each other along the outside 2 and inside 3 connection surfaces either by an adhesive or plastic welding, or by snapping the surfaces together, or in a similar way. During pushing the body 7 and the cap 8 together, two of the electrode inleads 11 seat in the opening(s) 6 of the extensions 4 and so these electrode inleads avoid the other two electrode inleads. Finally, the electrode inleads 11 are fixed in the metal pins 10 by pressing and their protruding portions are cut off.

The most important advantage of the invention is that the base construction described permits to avoid an accidental short circuit between the electrode inleads during the manufacturing process. It is an additional advantage that an inside connection surface is also formed which increases the strength of the compact fluorescent lamp base.

What is claimed is:

1. Base for compact fluorescent lamp comprising a body and a cap which are fixed to each other along an outside connection surface, a discharge tube is fixed in the cap and metal pins ensuring a releasable electrical contact are fixed in the body, electrode inleads of the discharge tube are connected to the metal pins, and a connection hollow ensuring an also releasable mechanical joint is formed in the body wherein at least one extension as an elongation of the wall of the connection hollow is formed inside the base, at least one opening is formed in the extension and some of the electrode inleads are connected to the metal pins through the opening.

2. Base for compact fluorescent lamp of claim 1 in which several electrode inleads are connected to the metal pins through one opening.

3. Base for compact fluorescent lamp of claim 1 in which one opening is formed in the extension for each electrode inlead.

4. Base for compact fluorescent lamp of claim 3 in which the opening narrows toward the connection hollow.

5. Base for compact fluorescent lamp of claim 1 in which an inside connection surface is formed between a matching piece made on the cap and the extensions.

6. Base for compact fluorescent lamp of claim 5 in which the inside connection surfaces are formed between the inner side of the matching piece and the outer side of the extensions.

7. Base for compact fluorescent lamp of claim 1 in which the discharge tube consists of at least eight tube portions.

8. Base for compact fluorescent lamp comprising a body and a cap which are fixed to each other along an outside connection surface, a discharge tube is fixed in the cap, and metal pins ensuring a releasable electrical contact are fixed in the body, electrode inleads of the discharge tube are connected to the metal pins, and a connection hollow ensuring an also releasable mechanical joint is formed in the body wherein extensions as elongations of the wall of the connection hollow are formed inside the base, and some of the electrode inleads are passed through between the extensions and then are connected to the metal pins.

* * * * *